United States Patent [19]

Sakurada et al.

[11] 3,928,858
[45] Dec. 23, 1975

[54] SYSTEM FOR SETTING PHOTOGRAPHING CONDITIONS

[75] Inventors: Nobuaki Sakurada, Yokohama; Soichi Nakamoto, Machida; Tadashi Ito, Tokyohama; Fumio Ito, Yokohama; Nobuhiko Shinoda, Tokyo, all of Japan

[73] Assignee: Canon Kabushiki Kaisha, Tokyo, Japan

[22] Filed: Oct. 15, 1974

[21] Appl. No.: 514,911

[30] Foreign Application Priority Data
Oct. 17, 1973 Japan.............................. 48-116578

[52] U.S. Cl.................. 354/23 D; 354/29; 354/43; 354/50; 354/60
[51] Int. Cl.²...................... G03B 7/00; G03B 7/20
[58] Field of Search ......... 354/23 D, 202, 286, 289, 354/270, 43, 50, 60, 29

[56] References Cited
UNITED STATES PATENTS
3,641,892  2/1972  Strehle.................................. 354/43
3,798,662  3/1974  Suzuki.............................. 354/24 D Primary Examiner—Robert P. Greiner
Attorney, Agent, or Firm—Toren, McGeady and Stanger

[57] ABSTRACT

A system for setting photographing conditions in which a switch means is engaged with a respective mechanism for setting various photographing informations and converts set values into signs or symbols, and digital information are obtained by selective change-over of the switch means in order to introduce digitalized photographing informations to an operation device.

5 Claims, 8 Drawing Figures

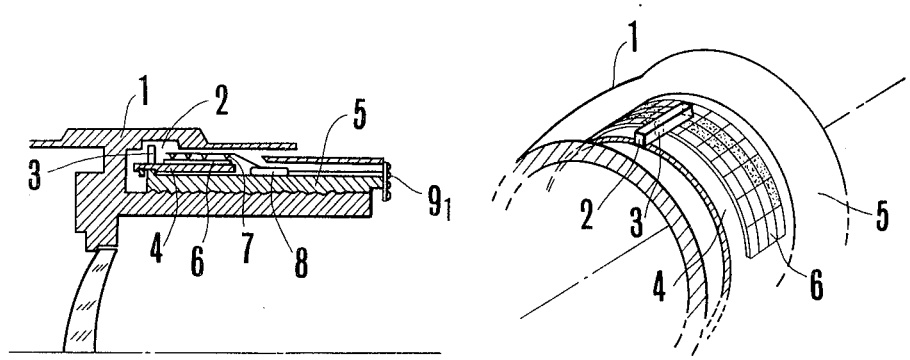
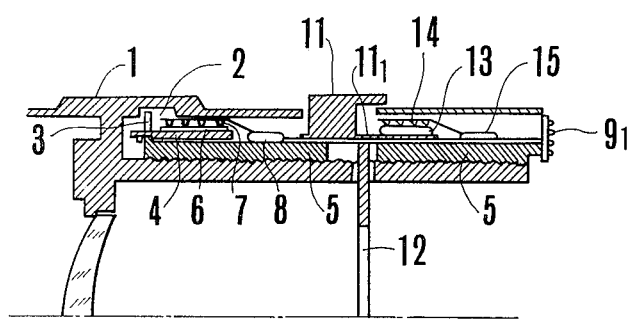
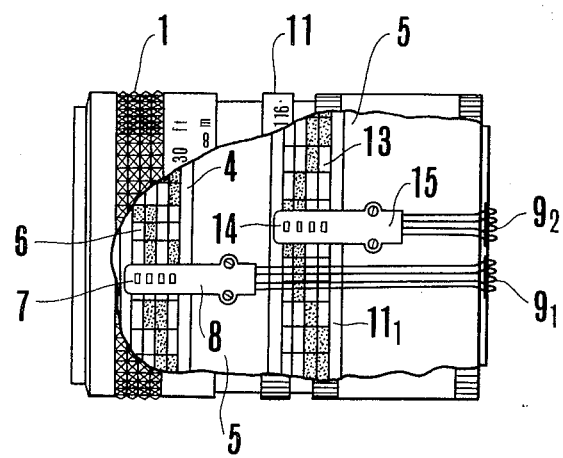

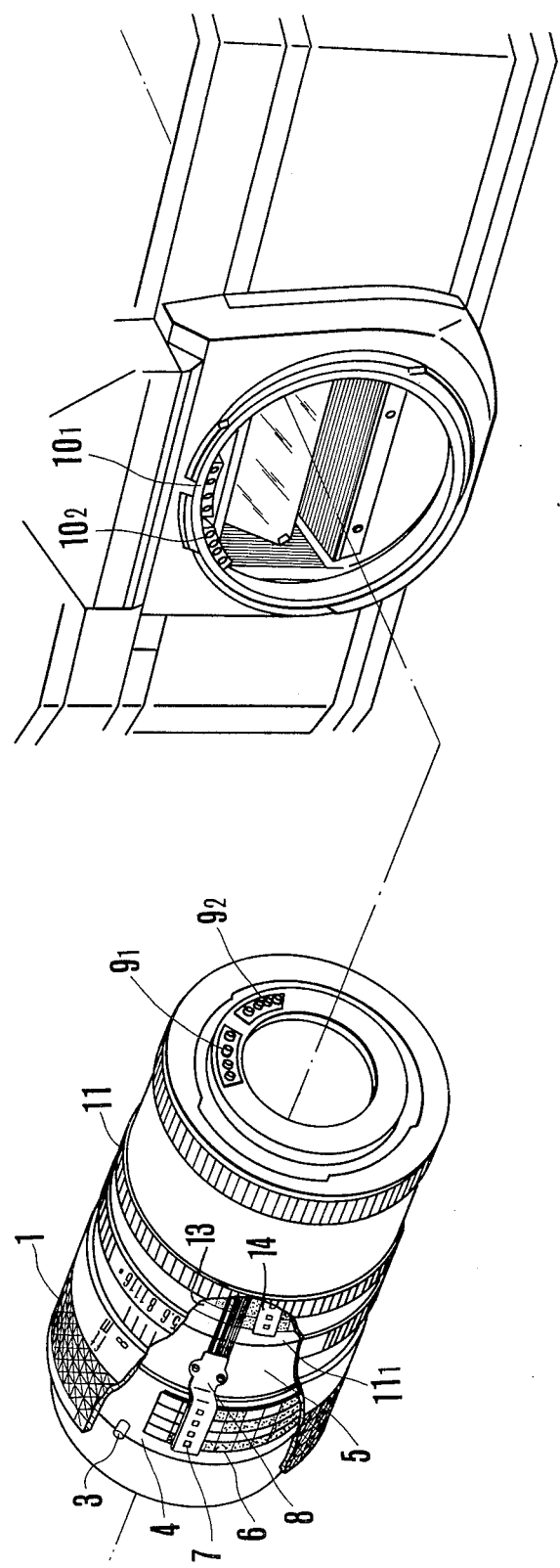

DIGITAL SIGNAL

SYSTEM FOR SETTING PHOTOGRAPHING CONDITIONS

BACKGROUND OF THE INVENTION

1. Field of the Invention

The present invention relates to a system for setting photographing information in a camera, in which various photographing informations such as diaphragm values and distance are computed as digital amounts and a proper exposure amount is determined by the output of the digital amounts.

2. Description of the Prior Art

In the field of a single lens reflex camera, in which various lenses are interchanged, recent trends are that photographing informations coming from a diaphragm presetting mechanism and a distance setting mechanism, etc. provided on the lens side are introduced into the camera side by some suitable means to obtain an appropriate exposure amount for ordinary photographing or flash photographing. Conventionally, for the introduction of these informations in this type of a camera, a method has been adopted by which the rotation position of the diaphram ring, the distance ring etc. is introduced as an analogue amount to control the exposure control circuit thereby. However, in the case of the information introduction based on the analogue amount, the accuracy of exposure amount is influenced by the accuracy of a transmission mechanism between the interchange lens and the camera, so that a high level of technical ability has been required for manufacturing the transmission mechanism. Thus the prior art has been confronted with increased lens and camera manufacturing cost.

Recently electronic techniques have been increasingly adapted in the camera manufacturing and digital techniques have been introduced into the field, and a camera provided with an exposure control device which converts and computes various photographing informations into digital amounts has been proposed. In this type of a camera, too, a similar defect has been confronted so far as various set values are introduced as analogue amounts from an information source on the side of the interchange lens to the camera side.

DESCRIPTION OF THE INVENTION

One of the objects of the present invention is therefore, to eliminate the above defect confronting the prior art by converting the photographing information of the lens side into digital amounts on the lens side and then transmitting them to the camera side.

Another object of the present invention is to provide a system which digitalizes distance information at the time of flash photographing and transmits it to the camera side.

Other objects and features of the present invention will be clear from the following descriptions of embodiments referring to the attached drawings.

BRIEF EXPLANATION OF THE DRAWINGS

FIG. 1 shows one embodiment of the present invention, particularly a cross section of main parts of a lens barrel showing a distance information setting member.

FIG. 2 is a perspective view of the main portions shown in FIG. 1.

FIG. 3 is a cross sectional view of the lens barrel in FIG. 1 with a diaphragm information setting member.

FIG. 4 is a plane view of the lens barrel in FIG. 3 with partial omission.

FIG. 5 is a slant view showing the relation between the lens barrel and the camera body.

FIG. 6b is an electrical circuit for FIG. 6a.

DESCRIPTION OF THE PREFERRED EMBODIMENTS

Figure 6A:
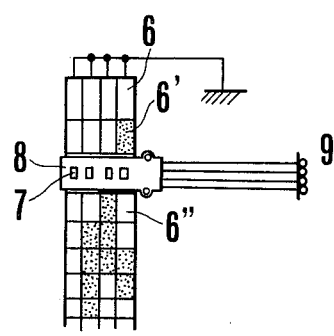
FIG. 6a shows the relation between the code plate and the contact plate of the information setting member.
Figure 6B:
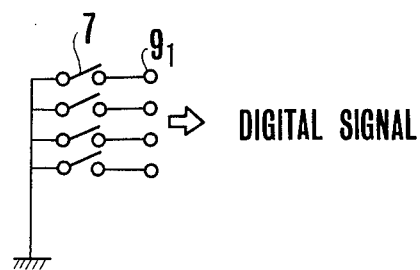

One embodiment of the present invention will be described by referring to the attached drawings.

In FIG. 1, which shows the distance information setting portion of the lens barrel, 1 is a distance adjusting ring, 2 is a guide groove arranged on the inside of the ring 1. 4 is a rotating member on which a guide pin 3 is planted and engages with the guide groove 2. 5 is a fixing member around which the rotation member 4 rotates. A code plate 6 is attached to the surface of the rotation member 4, and a contact plate 7 contacting the code plate is pressed against the surface of the code plate by a holding member 8 which is attached to the fixing member 5 and is connected to a pin plug 9 provided on the mount of the lens at its terminal.

In FIG. 2 showing the main portion of FIG. 1, the same numerical references as in FIG. 1 represent the same members or elements.

In FIG. 1 and FIG. 2, the information setting system of the present invention is applied to the distance information setting mechanism. However, this system can also be applied to a diaphragm adjusting mechanism by a similar construction as shown in FIG. 3 and FIG. 4. Thus, in FIG. 3, 11 is a diaphragm adjusting ring, 12 is a diaphragm adjusting device which is adjusted in correspondence to the rotation amount of the diaphragm adjusting ring 11. This diaphragm adjusting device 12 is designed to be locked by a magnet $Mg_2$ when the ring 11 is set to an EE index (not shown) and rotated by the shutter release to set a prescribed diapharam value. 13 is a code plate attached on a supporting plate $11_1$ united to the diaphragm adjusting ring 11. 14 is a contact plate which contacts the code plate 13 and is pressed against the surface of the code plate 13 by the holding member 15. The holding member 15 is attached to the fixing member 5 and is connected to a pin plug $9_2$ planted on the mount of the lens at its terminal as shown in FIG. 4. The pin plugs $9_2$ and $9_1$ are designed to be inserted into sockets $10_1$ and $10_2$ of the camera body when the lens barrel is mounted on the camera body.

In FIG. 6a showing the relation between the contact plate of the information setting portion and the code plate, since the relation is the same for the distance information setting portion and the diaphragm setting portion, descriptions will be limited to the relation between the contact plate of the distance information setting portion and the code plate. The code plate 16 forms a conductor portion 6' and an insulation system portion 6" with gray code, so that digital signals corresponding to the set position of the distance setting ring 1 are supplied to the respective outputs of the pin plug $9_1$.

In the above embodiment, 4-bit gray code (alternate binary sign) is used and thus the number of the transmission contact plates is four.

Figure 7:
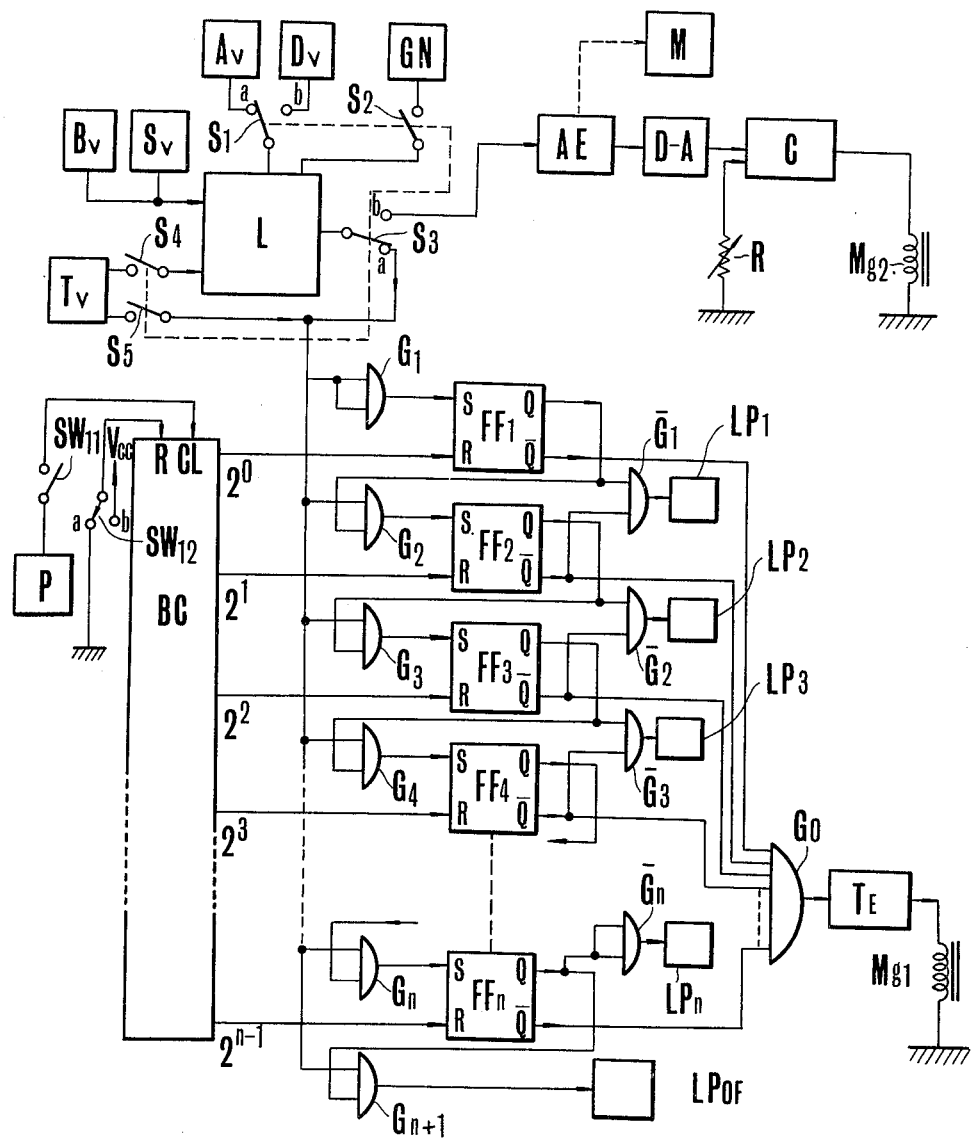
FIG. 7 is a block circuit of the digital exposure control device.

In FIG. 7 showing the digital exposure control circuit in which digital signals are input from the information setting portion, Av is the diaphragm information setting portion, Dv is the distance information setting portion. Only one of the digital signals from the information setting portions Av and Dv is input to the digital computing circuit L by the change-over switch $S_1$.

The change-over switch $S_1$ is changed over to the side of the diaphragm information setting portion a at the time of an ordinary photographing, and when a flash device is mounted on the camera for flash photographing, it is changed over to the side of the distance information setting portion Dv. In case of an ordinary photographing in which the change-over switch $S_3$ is changed over to the side of the fixed contact a, the output of the computing circuit L is added to a plurality of AND gates $G_1 - G_{n+1}$, and the outputs of the AND gates $G_1 - G_{n+1}$ are connected to set terminals S of a plurality of Flip-Flop circuits $FF_1$ to $FF_n$, and reset terminals R of these circuits $FF_1 - FF_n$ are connected to binary output terminals $2^0$, $2^1$ ...... of a binary counter BC. Also one output Q of the Flip Flop circuits $FF_1 - FF_n$ is respectively connected to next-step AND gates $\overline{G}_1 - \overline{G}_n$, and the other output $\overline{Q}$ is input to the AND gate $G_0$. The shutter time control circuit $T_E$ is actuated by the output of the gate $G_0$ to drive the shutter closing member by means of the magnet $Mg_1$. Further, standard pulses are added to the input terminal CL of the binary counter BC through a switch $SW_{11}$ from a standard pulse generator P, and the reset input terminal R is connected to a reset switch $SW_{12}$. The output of the AND gate $G_{n+1}$ is connected to an overflow indication lamp circuit LPOF, while the outputs Q, $\overline{Q}$ of the Flip-Flop circuits are connected to the indication lamp circuits $LP_1 - LP_n$ through the AND gates $\overline{G}_1 - \overline{G}_n$.

In case of a flash photographing in which the change-over switch $S_3$ is changed over to the side of the fixed contact D, the output of the computing circuit L is added to a D-A conversion circuit as a proper diaphragm information by means of the diaphragm control circuit AE and is converted into an analogue amount. The output of the D-A conversion circuit is added to a comparator circuit C to which a variable resistor R is connected. The resistance value of this resistor R is determined in correspondence to the rotation amount of the diaphragm adjusting device 12 which is actuated by the shutter release. Therefore, in the comparator circuit C, the magnet $M_2$ for diaphragm control is excited when the both inputs coincide. The diaphragm adjusting device 12 is locked by the magnet $Mg_2$ and set to a diaphragm value corresponding to the proper diaphragm information from the diaphragm control circuit AE. Meanwhile the pulse motion M may be driven directly by the output signal from the diaphragm control circuit AE to set the diaphragm adjusting device 12 to a proper diaphragm.

Tv is a time setting circuit used for a flash photographing, and the output of this setting circuit Tv is added to the computing circuit L and the AND gates $G_1 - G_{n+1}$ through the switches $S_4$ and $S_5$. These switches $S_4$ and $S_5$ associate with the switches $S_1$, $S_2$, $S_3$ and are designed to close when a flash device is mounted on the camera.

Operations of the above embodiment will be described hereinunder.

When an interchange lens is attached to the camera body by means of a bayonet, the pin plugs $9_1$ and $9_2$ on the lens side contact the sockets $10_1$ and $10_2$ on the camera side respectively to constitute an electrical circuit. Then the camera body and the lens body electrically contact each other at their conntacting surfaces (not shown) to constitute a feed-back circuit. Under this condition, when a signal (or DC voltage) is sent from the circuit on the camera side, the current caused thereby flows through the sockets $10_1$, $10_2$ — the pin plugs $9_1$, $9_2$ — the contact plates 7, 14 — the code plates 6, 13 — the lens — the circuit of the camera body.

Now explanations will be made in connection with the ordinary photographing. The change-over switches $S_1$ and $S_2$ have been changed over to the side of the fixed contact member a, and the switches $S_2$, $S_4$, $S_5$ are kept open. When the diaphragm adjusting ring 11 is set to a desired diaphragm value, the diaphragm adjusting device 12 is correspondingly set to this diaphragm value, the digital signal is added the computing circuit L from the diaphragm information setting portion Av through the above mentioned circuit. Also the computing circuit L is given brightness informations ASA from the light measuring circuit BY and the film sensitivity setting circuit Sv. Thereby, computing operation is effected in the computing circuit L to output a pulse train. Before the pulse train is output, namely under an initial state where no output pulse is given from the computing circuit L, the Flip-Flop circuits $FF_1 - FF_n$ are all under reset condition, and their output Q is (0) and their output $\overline{Q}$ is (1). Therefore, when the pulse train is output from the computing circuit L as above mentioned, the first output pulse passes through the AND gate $G_1$ and is added to the set input S of $FF_1$, and the output of $FF_1$ is inversed to (1) and the output $\overline{Q}$ is inversed to (0). When the second output pulse is sent, the AND gate $G_2$ gets "on" with this pulse and the Q(1) pulse from $FF_1$ and the second pulse is input to the input S of $FF_2$. Thereby $FF_2$ is inverted and Q becomes (1) and $\overline{Q}$ becomes (0). Each time the output pulse from L is sent out, the Flip-Flop circuits are set in the order of $FF_1$, $FF_2$ ........ corresponding to the number of the output pulses.

When an output pulse is sent out even after the Flip-Flop circuits are set up to $FF_n$, the AND gate $G_{n+1}$ gets "on" to illuminate the overflow lamp through the circuit LPOF to give warnings. In this way, the outputs of the Flip-Flop circuit are maintained in such a state that Q is (1) and $\overline{Q}$ is (0) so far as each of the Flip-Flop circuits is set. The output $\overline{Q}$ of the Flip-Flop circuit is input to the gate circuit G to constitute an AND gate whose output controls the time control circuit T to actuate the magnet M. Therefore, since the output $\overline{Q}$ of the Flip-Flop circuit set by the output pulse of the computing circuit L is (0), the AND gate $G_0$ becomes "off" and no control signal is sent to the control circuit $T_E$. The binary counter BC is maintained under reset condition by contacting instantaneously the switch $SW_{12}$ to the b terminal from the a terminal at the film winding-up. Therefore, under this condition, no signal is sent from each output of the counter to the reset input R of the Flip-Flop circuit. When the shutter release button is operated to effect the shutter release from this condition and the switch $SW_{11}$ is put "on" simultaneously with the start of the shutter front screen running, pulses of constant cycle are sent to the binary counter BC from the standard pulse generator P.

For example, when the cycle of the standard pulse is selected to 1mS (1/1000 second), a reset signal is caused to the first output $2^0$ of the binary counter 1/1000 second after the start of the running of the shutter front screen, and then sent to the reset input of the Flip-Flop circuit $FF_1$ to reset it. Thereby, the output Q is inverted to (0) and the output $\bar{Q}$ is inverted to (1). As above, the outputs $2^1$ and $2^2$ of the binary counter circuit send reset signals to the reset input of the Flip-Flop circuit in the order of $1/1000 \times 2 = 1/500$ second after, $1/1000 \times 2^2 = 1/250$ second after .........

Supposing that four output pulses are sent out from the computing circuit L, $FF_1$ to $FF_4$ are under set condition, while $FF_5$ and thereafter care under reset condition. Under this condition, when the output of the binary counter resets $FF_1$ to $FF_4$ successively one by one with a constant period of time, the time required for the output $2^2$ of the counter to reset $FF_4$ is $1/1000 \times 2^2 = 1/125$ second after the start of the running of the shutter front screen, and at this time the AND gate $G_0$ gets "on" and the motor M is actuated by the control circuit T to close the shutter, thus effecting exposure of 1/125 second.

Next explanations will be made in connection with the flash photographing.

When a flash device (not shown) is attached to the camera body, the change-over switches $S_1$ and $S_3$ are changed over to the side of the contact point $b$ and the switches $S_2$, $S_4$ and $S_5$ are closed. And when the diaphragm adjusting ring 11 is set to EE indices (not shown) and the distance ring is set to the shooting distance, a digital signal is added to the computing circuit from the distance information setting portion Dv through the circuit mentioned hereinbefore. Also the computing circuit L is given ASA information from the film sensitivity setting circuit Sv and at the same time given guide number information from the guide number setting portion GN. Further the flash time (for example 1/10 second) information is added to the computing circuit from the time setting circuit Tv. Thereby, computing operation is effected in the computing circuit L to output a pulse train to the diaphragm control circuit AE. The diaphragm control circuit AE addes the pulse train as a proper diaphragm information to the A-D conversion circuit to convert it into analogue amount, and the analogue output of the A-D conversion circuit is added to the first input terminal of the comparator circuit. Then the diaphragm adjusting device 12 is rotated by the shutter release operation, and the resistance value of the variable resistor R changes in correspondence to the rotation. As the resistance value of the variable resistor R determines the input voltage of the second input terminal of the comparator circuit $C_1$ the input voltage of the second input terminal concides with the input voltage of the first input terminal, the comparator circuit C excites the magnet $Mg_2$ by its output. Thus, the diaphragm control device 12 is locked by the magnet $Mg_2$ and set to a proper diaphragm value.

Meanwhile, the flash time information from the time setting circuit Tv is added to the AND gates $G_1$ to $G_{n+1}$ and similar operations as in the ordinary photographing are conducted to effect 1/60 second exposure.

What is claimed is:

1. A system for setting photographing informations of a camera comprising:

a camera body having a digital exposure control means;

an interchangeable lens attached to the camera body, having:

an operation means for setting photographing information, and photographing information setting means having means for coding set values in correspondence to the values set by the operating means; and a connecting means for connecting the photographing information setting means to the digital exposure control means, and for supplying the digital output of the setting means to the digital exposure control means.

2. A system according to claim 1 in which the coding means is a rotary encoder.

3. A system according to claim 1 in which the connecting means comprises a pin plug and a socket.

4. A system for setting photographing informations of a camera comprising:

a camera body having a digital exposure control means;

an interchangeable lens attached to the camera body, and having:

a diaphragm adjusting ring for setting diaphragm values, and a diaphragm information setting means having means for coding its set diaphragm values in correspondence to values set by the diaphragm adjusting ring; and a connecting means for connecting the diaphragm information setting means to the digital exposure control means, and for supplying the digital output of the setting means to the digital exposure control means.

5. A system for setting photographing informations of a camera comprising:

a camera body having a digital exposure control means;

an interchangeable lens attached to the camera body, having:

a diaphragm adjusting ring, a diaphragm information setting means having a means for coding its set diaphragm values in correspondence to the values set by the diaphragm adjusting ring, a distance adjusting ring for setting distance, and a distance information setting means having coding means for distance information which codes its set values in correspondence to values set by the distance adjusting ring;

a first connecting means for connecting the diaphragm information setting means to the digital exposure control means;

a second connecting means for connecting the distance information setting means to the digital exposure control means; and a switch means provided between the first and second connecting means and the digital exposure control means, said switch means connecting the first connecting means to the digital exposure control means at the time of ordinary photographing, and connecting the second connecting means to the digital exposure control means at the time of flash photographing.

* * * * *